US012314810B2

(12) United States Patent
Seib

(10) Patent No.: US 12,314,810 B2
(45) Date of Patent: May 27, 2025

(54) METHOD FOR AUTHENTICATING A HIGH-VALUE ITEM

(71) Applicant: Wolfgang Seib, Schopfloch (DE)

(72) Inventor: Wolfgang Seib, Schopfloch (DE)

(73) Assignee: Wolfgang Seib, Schopfloch (DE)

( * ) Notice: Subject to any disclaimer, the term of this patent is extended or adjusted under 35 U.S.C. 154(b) by 0 days.

(21) Appl. No.: 18/291,885

(22) PCT Filed: Jul. 26, 2022

(86) PCT No.: PCT/DE2022/000083
§ 371 (c)(1),
(2) Date: Jan. 24, 2024

(87) PCT Pub. No.: WO2023/006135
PCT Pub. Date: Feb. 2, 2023

(65) Prior Publication Data
US 2024/0330629 A1  Oct. 3, 2024

(30) Foreign Application Priority Data
Jul. 27, 2021  (DE) .......................... 202021002500.6

(51) Int. Cl.
*G06K 7/14* (2006.01)
*G06K 19/06* (2006.01)
*G07D 5/00* (2006.01)

(52) U.S. Cl.
CPC ..... *G06K 7/1417* (2013.01); *G06K 19/06103* (2013.01); *G07D 5/005* (2013.01); *G07D 2205/00* (2013.01)

(58) Field of Classification Search
CPC ............. G06K 7/1417; G06K 7/10861; G06K 19/06037; G06K 19/06103; G06F 16/9554

(Continued)

(56) References Cited

U.S. PATENT DOCUMENTS

2011/0238589 A1  9/2011  Willis et al.
2014/0319209 A1*  10/2014  Beadles ............. G06Q 30/0207
                                                    235/494

FOREIGN PATENT DOCUMENTS

CA      3076962 A1 *  4/2019  ........... G06T 1/0021
CH       693973 A5    5/2004
WO    2017029247 A1   2/2017

OTHER PUBLICATIONS

German Application No. 20 2021 002 500.6, title "Method for Authenticating a High-Value Item", filed Jul. 27, 2021.

(Continued)

*Primary Examiner* — Edwyn Labaze
(74) *Attorney, Agent, or Firm* — Kilpatrick Townsend & Stockton LLP

(57) ABSTRACT

A method for authenticating a high-value item, wherein an optically identifiable code is generated and applied to the item by being integrated into a surface region of the item that is provided with graphics or a surface structure, wherein the code is in the form of a two-dimensional arrangement of code elements and the outline of the two-dimensional arrangement is adapted to the outline of the surface region or of part of a surface region, and wherein the code is linked to an information source that provides information, able to be displayed on a display, in relation to the item, and wherein a reader, such as for example a smartphone, is provided with programming for detecting and reading the code and, when the code is read, the link to the information source is activated and the information is displayed on the display of the reader.

9 Claims, 1 Drawing Sheet

(58) Field of Classification Search
USPC .................... 235/462.1, 462.09, 462.07, 375
See application file for complete search history.

(56) References Cited

OTHER PUBLICATIONS

PCT Application No. PCT/DE2022/000083, title "Method for Authenticating a High-Value Item", filed Jul. 27, 2022.
PCT Application No. PCT/DE2022/000083, International Search Report and Written Opinion, mailed Nov. 8, 2022, 6 pages.

\* cited by examiner

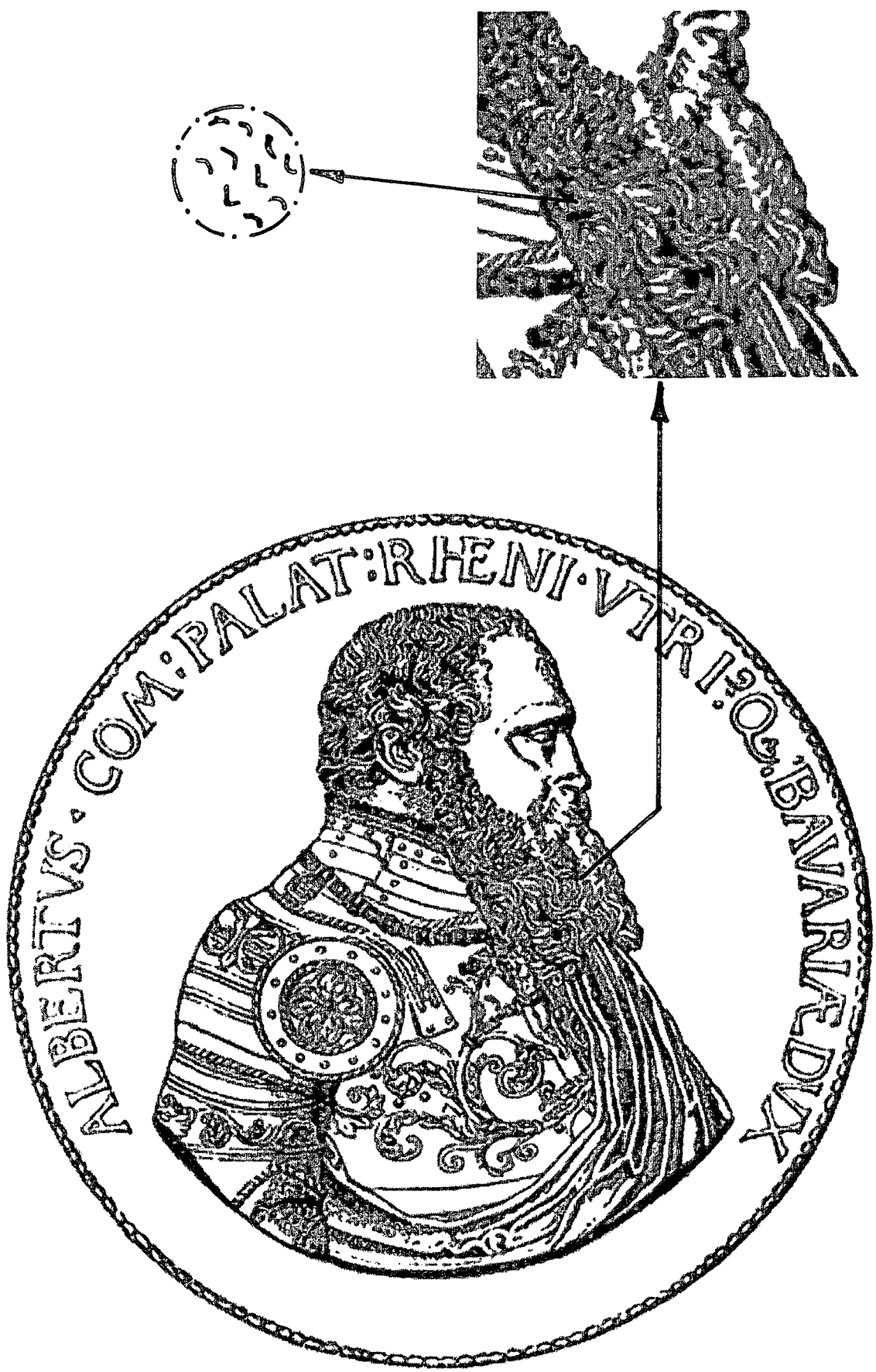

METHOD FOR AUTHENTICATING A HIGH-VALUE ITEM

CROSS-REFERENCES TO RELATED APPLICATIONS

The present application is a 371 Application based on PCT Application No. PCT/DE2022/000083, filed Jul. 26, 2022, which claims priority and benefit from German Patent Application No. 20 2021 002 500.6, filed on Jul. 27, 2021.

Background of the Invention

The invention relates to a method for authenticating, e.g., verifying the authenticity of, a high-value item such as a coin or medal, a precious-metal bar, a piece of jewelry or an art object, an expensive watch or the like, by which method an optically identifiable code is generated and applied to the item, from where it can be read and interpreted.

Valuable items such as coins, medals, precious-metal bars and other valuable items such as art objects depend, in terms of their value, largely on the question of authenticity. It is common practice to issue certificates to confirm the authenticity of such items. Such certificates of authenticity have the disadvantage of not being connected to the item itself, so that the problem of authenticity shifts to the question of whether the item is actually the certified item, because there is no connection between the certificate and the item, but then the problem also involves the question of whether the certificate itself may have been counterfeit.

Providing the item itself with an appropriate marking is of little help because, on the one hand, it is undesirable to apply a visible marking to the item itself, as it might deface the item, but even if the marking is invisible to the eye and can only be seen under UV light, for example, it does not provide safe protection against counterfeiting, since common markings, if recognizable by counterfeiters, can also be easily copied by counterfeiters. Therefore, marking such items with coded information in the form of conventional barcodes, QR codes or the like is not suitable way to provide counterfeit-proof marking. Such markings would always be recognized as code, which means they can also be read and copied as code, even if the information content is unrecognizable.

However, apart from the need for authenticity marking of valuable items, there may also be a need to provide an item of material or non-material value with information about the item, such as its origin, age, or designer or artist. This may be the case in particular with items in collection systems such as albums or cassettes, where providing a detailed description of the item in the collection system itself is difficult and usually disruptive. In this case, too, it would be useful and desirable to provide the item itself with a marking that allows such information to be made visible without interfering with the item itself, and is virtually invisible.

Conventional security features such as holograms, which are mainly used on banknotes, are also not useful for the purpose described, as they are also easily visible and can therefore be copied.

Consequently, the object of the invention is to provide a method for authenticating valuable or high-value items, which overcomes the problems of conventional measures.

According to the invention, this object is achieved by the method specified in claim 1, which is advantageously further developed by the features of the dependent claims.

Summary of the Invention

In the inventive method, the items are provided with a permanent, quasi-invisible marking in the form of a special code that protects the item against counterfeiting and can serve in particular as a hidden and invisible or visually imperceptible security feature. The code can be read with a suitable reader such as a smartphone that includes a special app, with the content of the code itself being unrecognizable to the user, but the code serving as a link that redirects the user to a website. The app may be freely available to the user and be downloaded to the smartphone from an app store, for example.

The code consists of a two-dimensional pattern of tiny elements, which may be short line elements that can have different shapes and orientations, i.e., may be straight, curved, or bent at different angles. Small area elements such as dots or the like may also be included in the two-dimensional pattern.

The elements of the code are scattered in surface regions of the items to be marked, which are covered by an image pattern, a graphic pattern such as a decoration or lettering, or which are not smooth in some other way, the surface patterns being flat (e.g., printed) or relief-like (such as engravings). Unlike a QR code, the two-dimensional pattern preferably does not have a regular outline; rather, the outline may be arbitrary, and in particular it may be adapted to the shape of the respective surface region or of a part of it. Thus, for example, the shape of the two-dimensional pattern of the code may be an elongate, curved or angular, potato-shaped or other irregular outline.

The individual elements of the code may be the same color or different colors. In particular, their color may be matched to the respective color of the area in which they are embedded, in which the color is not contrasting, but similar so that the elements can only be identified by the reader via the app, separately from the background, and are recognizable in their entirety as a code, but are not perceptible to the eye of the viewer.

The invention makes use of the fact that high-value items of the above type are virtually always provided with graphics, a picture or decorative elements in at least one surface region or, as is regularly the case with art objects, have at least one non-smooth bottom surface or, for example in the case of paintings, a non-smooth reverse side, where a marking according to the invention can be placed to be concealed within the pictorial representation and not perceivable by the viewer. Therefore, the viewer cannot perceive that, or whether, the item has been provided with such a marking at all.

The marking according to the inventive method is different from conventional marking not only in that a viewer of the item cannot read it even on close inspection, or in fact tell whether it exists at all, but also in that it can be applied to different items in a relatively connected or unconnected manner and may be adapted to fit various geometries, e.g., in different regions of a graphic or an image representation on the item, possibly divided and adapted to the outline of the respective graphic or image area. In contrast to a conventional barcode or QR code, in which the individual code elements are geometrically related to each other in a predetermined and unchangeable way to be readable, the markings according to the invention are composed of individual unconnected line elements that can be geometrically arranged as desired, and can therefore be easily integrated into a graphic or an image representation on the item or, for example, hidden in a rough bottom surface or reverse surface of an item. Thus, the marking according to the invention can be adapted to the respective graphics. In the case of watches, for example, the dial usually includes numbers, lines, graphics, or text. The arrangement of line elements may be embedded almost invisibly in these distinct areas.

The marking according to the inventive method may be referred to as a "worm pattern", because the individual line elements are reminiscent of worms and may be applied in the manner described, distributed over a surface region and integrated into a graphic that is provided there, where their number, geometrical arrangement, thickness and even their color may serve in their entirety as a personalized code, the meaning of which can be assigned or defined by the user as desired. Instead of a pattern purely composed of line elements, a pattern with small area elements such as dots can also be used as a code, preferably in combination with line elements.

As indicated above, the marking according to the inventive method can be divided into several areas. For example, one part may be located in an upper right-hand corner and another part in a lower left-hand corner of a graphic. It may also be divided into two or three busier or darker regions of a graphic, where it stands out particularly poorly from the background. Or the marking may extend over part of, or all of, a circular ring area or another band of area, or may be integrated into lettering.

Even a completely smooth item, such as a precious-metal bar that is smooth on all sides, the value of which depends on its material, not its surface properties, may be provided with such a marking as a security feature by applying to a surface portion a decorative graphic that can be arbitrarily selected to conceal the marking in it. In the case of precious-metal bars, for example, the indication of value or purity, usually applied together with an indication of origin, is sufficient for embedding the marking designed as a worm pattern. The smooth surface of a precious-metal bar, for example, may also be provided with a decorative line pattern, such as a wavy pattern, to conceal the marking in it. None of this is possible with the visual design of a bar code or QR code.

The marking may be applied to the item in any suitable way, e.g., by printing, engraving or lasering. However, the marking may also be applied by embossing, stamping, punching or casting, by including the code elements in the respective tool as an integral part of the surface pattern to be produced, i.e., the respective embossing tool, punching tool or casting mold. This can be easily done because nearly all tools today are manufactured on CNC machines.

The method according to the invention further comprises providing a reader for reading the code, and the process of reading with the reader, which is appropriately programmed to be able to recognize and capture the code. The reader is preferably a smartphone with a special app installed on it containing the program for recognizing and reading the code. As mentioned above, this app may be freely available and may be downloaded by the user onto their smartphone.

The code itself may include a destination address and thus embody a link that is activated by reading the code and uses it to call up an associated information source in the form of a website, which then presents to the user visible information on the display, e.g., information about the item in question, which indicates its essential characteristics and confirming its genuineness or authenticity, and which may also indicate further information about the item in question, such as its origin, number, time of manufacture, purity or other properties of the item.

Another advantageous use of the marking according to the inventive method is that it makes the respective item traceable in terms of its origin, e.g., to verify compliance with supply chains. The marking with the worm pattern according to the invention is not only relevant as a security marking, but may also serve as a digital certificate.

The method according to the invention, the general features of which have been described above, will be presented in more detail below, with its function and implementation described more closely.

The function and implementation of the process is relatively simple. First, the destination address or the data and information to be assigned to the product are determined. In particular, it is possible to apply to the product a non-visible linking code as described above. The code may comprise only a numerical code or text. However, it is also possible to integrate on the product information about the product, or a graphic etc., which may then be displayed directly on the reader.

The user can be directed, via the linking code, to a website, which may also be a store, a landing page, a web address, a special link, an online address or any network connection and/or address. Everything that is possible on the Internet, online and digitally can then be realized and implemented here. The link may also be dynamic, i.e., may lead to a respective target address via redirects that may optionally be substituted or may change.

The invention provides the ideal hybrid solution, i.e., a physical item invisibly connected to the digital and virtual world of the internet, without changing the product's shape, properties, or appearance. Even blockchain technology may be integrated.

The linked destination address that the code leads to can be used to implement on the reader's display anything the Internet has to offer. A film that is then replayed, text or voice information, telecommunications, exchange of data and information, matching of relevant data etc. are all possible. Even changing websites and dynamic links can be implemented.

It is also possible to implement a security query by linking the product to a website, domain address etc. Thus, there can be one-off access after the first input, with third parties no longer given access. In this way, security of ownership can be achieved, especially for expensive and rare or limited products of high value.

The link address etc. is now broken down and converted into small dots, dash elements, line elements, worms and/or small area elements. The choice of which dashes, dots, lines, worms etc. to use in which amount and distribution, as well as their arrangement, color, and size, depends on the respective design, i.e., the graphic or image etc. This is the only way to achieve almost invisible integration of the lines and dashes etc.

The graphic or image etc. can now be enlarged to previously defined dimensions in the exact ratio. The graphic pattern or image pattern converted to dots, dashes, lines, worms etc. can now be embedded as a code in the image or surface structure of the item using the previously precisely defined enlargement.

It can then be checked whether the dashes, lines, dots etc. integrated as code into the surface pattern of the item have changed the image or the graphic or surface structure of the item in an undesirable way. It may be necessary to make further adjustments and changes to achieve an optimal result. A perfect result has been achieved when the inserted small dots, dashes, lines, worms etc. are almost imperceptible in the enlarged image and have a smooth transition to the background image or surface structure.

The dots, dashes, lines, and worms are not necessarily only embedded in the empty spaces of the graphic/image/ design/surfaces to be processed, but may also be applied directly to the visible surface pattern or image pattern. This makes it even more difficult to discern what belongs to the image pattern, graphic pattern or other surface pattern and what belongs to the code.

What is only slightly visible in a very enlarged state then becomes even less visible when subsequently reduced to the desired original size, and is therefore ideal for a quasi-invisible code.

Implanting the code into any type of tool, such as punching tools, injection molding tools, deepdrawing tools, pressing and embossing tools, as well as for all types of molds, e.g., in printing plates etc. can also be implemented. This makes it possible, for example, to automatically integrate the code as early as during manufacture of series products such as coins and medals, metal bars, watches, writing utensils, household items, cosmetics, jewelry, etc. For example, the invisible code may already be integrated into the embossing tool, punching tool or casting tool for manufacturing coins, medals or metal bars. As a result, for example, each metal bar or coin manufactured or any product or article will automatically receive an invisible identification code.

Depending on the security requirements, visual presentation, recognizability, etc., the code may be applied to any place on the product. It is also possible to integrate several partial codes in different places on the product, so that a single valid code is only created by combining all partial codes in one or several scanning processes.

As the code consists of dots, dashes, lines, worms or small areas, very good and hidden placement is possible. This is particularly useful if, for example, in the case of a coin or metal bar with a relief, the hidden code is located on the lower surface of a graphic or an image. Thanks to the freedom in designing the code, it is also possible to combine the codes applied in relief on the lower surface and the codes integrated directly into the graphic. This means even better visual adaptation to the graphic, but above all even greater security.

Three-dimensional integration of the code (surface, relief, and transition on the sides) creates even more flexibility and security. This can be a two-dimensional code on a surface, joined by an additional code on a side. A further development of the method according to the invention is a measure for copy protection of the code applied according to the method.

For this purpose, the product provided with the code, or its surface area containing the code, may have applied to it a coating that is imperceptible to the human eye and has extremely light-reflecting particles dispersed in it; the coating may be a special paint in which extremely reflective beads in the micro range are distributed. By optimally adjusting the size, geometry, number and color of such microbeads, they can be perfectly adapted to the respective surface graphic or surface structure. This also allows the intensity of the glare effect produced by the beads to be optimally adjusted.

If an attempt is made to copy the image on a photocopier, the image becomes white and blurry due to the glare effect when being illuminated by the photocopier during scanning, so that nothing is recognizable.

Brief Description of the Drawing

The attached figure schematically depicts a coin (bottom) as well as a first magnification of a section of the coin image (top right) and a second magnification of a section of the first magnification (top left).

EXAMPLE

The attached drawing shows, as an exemplary item, a coin or medal with a coin image comprising a legend and a pictorial representation of the upper body of a man in armor. A section of the beard region of the head of the man depicted in the coin image has been enlarged to the top right, which is also an example of a region of the coin image that is confusing due to a tangle or a multitude of lines. This region is particularly suitable for placing a code according to the above-described method in the form of a two-dimensional arrangement of individual line elements; the outline of the arrangement may be adapted to the outline of the beard region.

Such a two-dimensional arrangement in the form of a pattern of individual line elements in a two-dimensional arrangement is shown as an example, enlarged again to the right, as a small section of the pattern in the dot-dashed circle.

The specific shape of the individual line or dash elements and their relative arrangement, thickness, length, geometric shape (straight, bent or curved) and also their color can be freely selected, and the arrangement of line or dash elements as a whole forms a code which can be assigned a selectable meaning. The line elements can be characterized by shorter or longer, straight or curved dash portions, which may be the same or different from each other, and which may be arranged in the same orientation or different orientations.

The individual line elements are thus applied to the coin or medal in such a way that they are at least largely invisible to the human eye, even if they have been physically produced by embossing, because the elements forming the code appear to the viewer as part of the coin image and the viewer therefore cannot realize that there is a marking, let alone differentiate between image and code. However, reading is possible with a reader such as the camera of a smartphone equipped with a special app that can recognize the arrangement of the line elements as a code.

Even if the line elements were by themselves (just barely) perceptible to the eye, they will, on the one hand, disappear in the tangle of lines of the representation of the beard in the coin image and will appear to the viewer as part of the coin image or another image or surface pattern on the item, for example in the form of decoration or ornamentation.

In the same way, for example, the hair region of the coin image, or some other region of the coin image, would be suitable for accommodating such a line element pattern representing a code.

The invention claimed is:

1. A method for authenticating a high-value item, the method comprising:
   generating and applying to the item an optically identifiable code; and
   reading and interpreting said code using a reader,
   wherein:
      a surface region of the item provided with a graphic or a surface structure, or a part of said surface region, is selected,
      a code is generated in the form of a two-dimensional arrangement of code elements in the form of line and/or area elements, the code having an information content, the outline of the two-dimensional arrangement being adapted to the outline of the surface region or of the part of a surface region,
      the code elements being integrated into the graphic or surface structure of the surface region or the part of a surface region, the code is further linked to an information source that provides information, able to be displayed on a display, in relation to the item, a reader, such as a smartphone, is provided with programming for recognizing and reading the code, and when the code is read, the link to the information source is activated and the information is displayed on the display of the reader.

2. The method according to claim 1, wherein the code elements comprise line elements that are straight, curved, or bent at different angles, and/or area elements that are round, angular or of any desired shape and have the same color or different colors.

3. The method according to claim 1, wherein the two-dimensional arrangement of code elements is flat or curved fitting the surface region or the part of a surface region, or is adapted to a relief of the surface region.

4. The method according to any one of claim 1, wherein the code is integrated in the form of two or more partial codes, each having the form of a two-dimensional arrangement of code elements, on two or more spaced-apart parts of a surface region or on different spaced-apart surface regions of the item, the partial codes being captured together when being read.

5. The method according to any one of claim 1, wherein the code is integrated into the graphic by first extremely enlarging the graphic, integrating the code into the graphic in a form that has also been extremely enlarged, and then reducing the graphic, including the integrated code, back to its intended size and applying it to the item.

6. The method according to any one of claim 1, wherein the code is applied to the item by printing, engraving or laser engraving.

7. The method according to any one of claim 1, wherein the code is integrated into a working surface region of a pressing tool, punching tool, embossing tool, casting mold or other tool, which working surface region is used for producing a surface structure of the item, so as to produce the surface structure provided with the code during manufacture of the item.

8. The method according to any one of claim 1, wherein the code is linked to the information source indirectly via at least one intermediate location through which the connection to the information source can be manipulated.

9. The method according to any one of claim 1, wherein at least the surface region of the item provided with the code is coated, after integrating the code, with a coating that has extremely light-reflecting microparticles dispersed in it.

* * * * *